United States Patent
DeWulf

(10) Patent No.: US 6,683,867 B1
(45) Date of Patent: Jan. 27, 2004

(54) PARALLEL PRECISE TIME TRANSFER TO MULTIPLE GPS UNITS

(75) Inventor: Thomas V. DeWulf, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/504,024

(22) Filed: Feb. 18, 2000

(51) Int. Cl.[7] .................................................. H04J 3/06
(52) U.S. Cl. ..................... 370/350; 370/522; 455/456.1; 455/456.5
(58) Field of Search ................... 370/498, 329, 370/330, 336–338, 345, 349, 503, 507, 509, 510, 350, 522; 455/352, 456.1, 456.5, 456.6; 710/1; 702/147; 342/352, 357.06, 357.12

(56) References Cited

U.S. PATENT DOCUMENTS

| | | | | |
|---|---|---|---|---|
| 5,185,610 A | * | 2/1993 | Ward et al. ............ 342/357.11 |
| 5,504,684 A | * | 4/1996 | Lau et al. ................... 455/3.02 |
| 5,519,403 A | * | 5/1996 | Bickley et al. ............. 342/352 |
| 5,948,073 A | * | 9/1999 | Chapin et al. .................. 710/1 |
| 6,002,708 A | * | 12/1999 | Fleming et al. ............. 375/130 |
| 6,011,977 A | * | 1/2000 | Brown et al. ............... 455/503 |
| 6,252,544 B1 | * | 6/2001 | Hoffberg ................. 342/357.1 |
| 6,393,291 B1 | * | 5/2002 | Hwang ..................... 455/456.1 |
| 6,430,503 B1 | * | 8/2002 | McBurney et al. ......... 701/213 |
| 6,483,856 B1 | * | 11/2002 | Bird ........................... 370/503 |
| 6,484,035 B2 | * | 11/2002 | Allen, Jr. ................. 455/456.1 |
| 6,508,122 B1 | * | 1/2003 | McCall et al. ........... 73/504.12 |
| 6,574,244 B1 | * | 6/2003 | Petrie et al. ................ 370/503 |

* cited by examiner

Primary Examiner—Ricky Ngo
Assistant Examiner—Yvonne Q. Ha
(74) Attorney, Agent, or Firm—Nathan O. Jensen; Kyle Eppele

(57) ABSTRACT

A system for interconnecting multiple GPS receivers via a single line to simultaneously communicate both serial data and precise timing pulses to numerous GPS receivers using a time multiplexed data format.

23 Claims, 2 Drawing Sheets

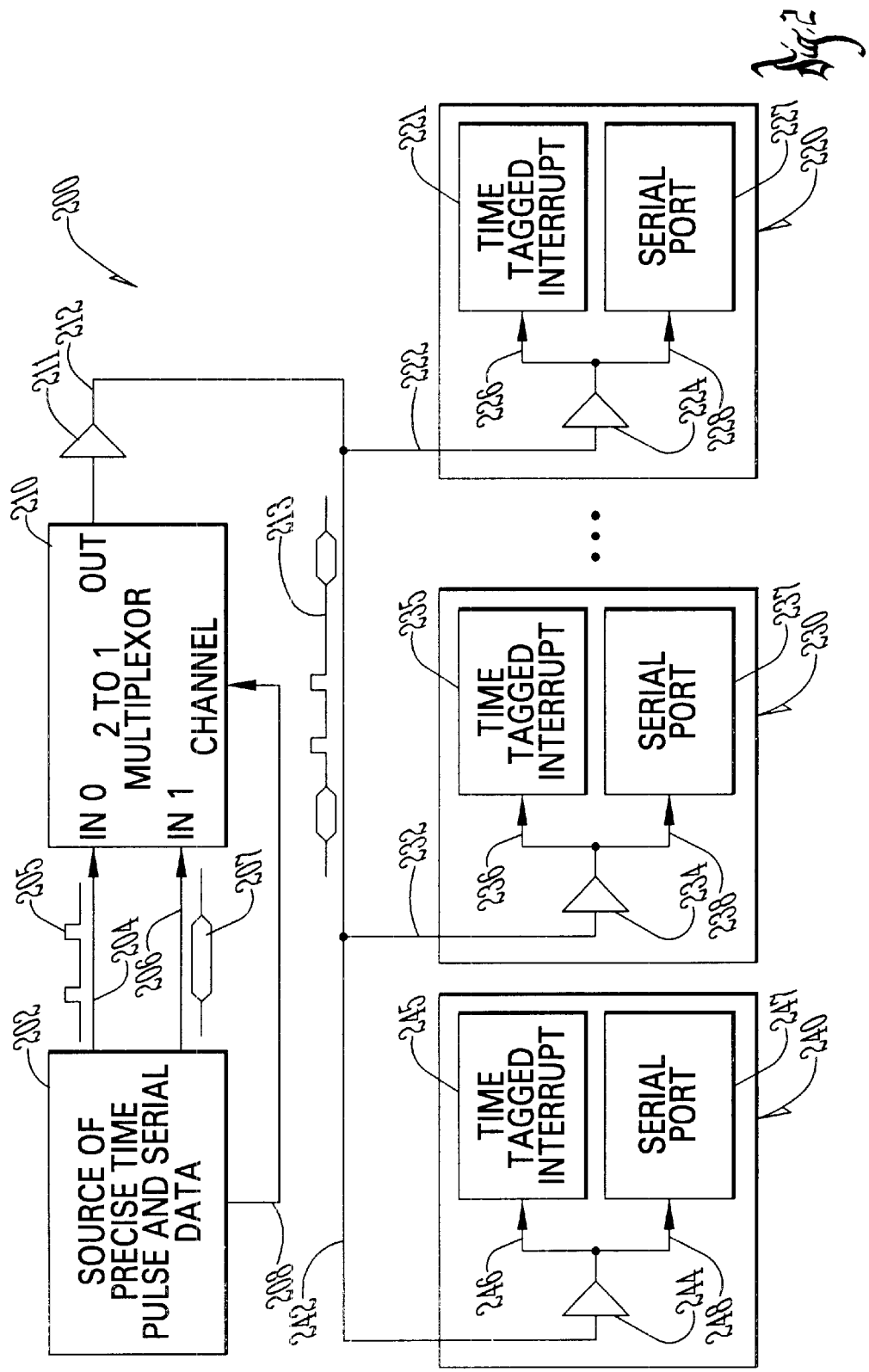

PARALLEL PRECISE TIME TRANSFER TO MULTIPLE GPS UNITS

FIELD OF THE INVENTION

The present invention generally relates to global positioning systems (GPS), and more particularly relates to communication to multiple GPS receivers.

BACKGROUND OF THE INVENTION

In the past, designers of GPS receiver systems have frequently used one GPS receiver to provide precise time information to another GPS receiver. Typically, the time source GPS is coupled to the time receiving GPS receiver by a serial data interface and a timing interface line which provides a timing pulse (or pulse train). When two or more time receiving GPS receivers are used, then separate data and time interface lines would be run to each time receiving GPS receiver. In other cases, the time receiving GPS receivers might be ganged together by connecting separate data and time sync interface lines from the output of a broadcasting GPS receiver to the input of multiple GPS receivers.

In some applications, it may be desirable to include many GPS receivers in a single deployable unit. For example, numerous surveillance units may be dropped in an area to be monitored, via an airdrop. In such cases, to conserve battery life, the GPS receivers may be turned off until just before deployment. In such cases, it may be desirable to quickly initialize the many GPS receivers by a single time standard (such as a reference GPS receiver used by the airplane navigation system) prior to the airdrop.

While these prior art interfaces have been used extensively in the past, they have several drawbacks. First of all, the direct wiring approach becomes increasingly cumbersome as the number of time receiving GPS receivers grows. Additionally, the ganged approach is undesirable because as the number of time receiving GPS receivers grows, the number of connections grows. With each additional connection, there is an increased potential for a failed connection, which would affect all "downstream" GPS receivers. Furthermore, separate interfaces for serial data and time synchronization pulses doubles the total number of connections required. This becomes more burdensome when a larger number of receivers must be initialized.

Consequently, there exists a need for improvement in systems and methods for communicating with multiple GPS receivers.

SUMMARY OF THE INVENTION

It is an object of the present invention to facilitate ease of communication with multiple GPS receivers.

It is another object of the present invention to provide an enhanced method of communicating to a network of GPS receivers.

It is a feature of the present invention to utilize a single serial line to interconnect numerous GPS receivers.

It is another feature of the present invention to include a single 2-to-1 multiplexor coupled to a source of a precise time pulse and serial data.

It is an advantage of the present invention to better enable sharing of information with a network of GPS receivers.

It is another advantage of the present invention to reduce weight in a multiple GPS system.

It is yet another advantage of the present invention to reduce the potential for single connection faults that could break communication paths to multiple GPS receivers.

The present invention is an apparatus and method for communicating information with GPS receivers, which is designed to satisfy the aforementioned needs, provide the previously stated objects, include the above-listed features, and achieve the already articulated advantages. The present invention is carried out in a "direct wire" in a sense that the number of direct independent wires has been greatly reduced.

Accordingly, the present invention is a system and method for communicating information with multiple GPS receivers, which uses a single serial data/timing line interconnecting multiple GPS receivers. This line alternates between data transmission and time synchronization pulses functions in a time multiplexed fashion.

BRIEF DESCRIPTION OF THE DRAWINGS

The invention may be more fully understood by reading the following description of the preferred embodiments of the invention, in conjunction with the appended drawings wherein:

FIG. 2 is a simplified diagram of a multiple GPS receiver interconnection system of the present invention.

DETAILED DESCRIPTION

Figure 1:
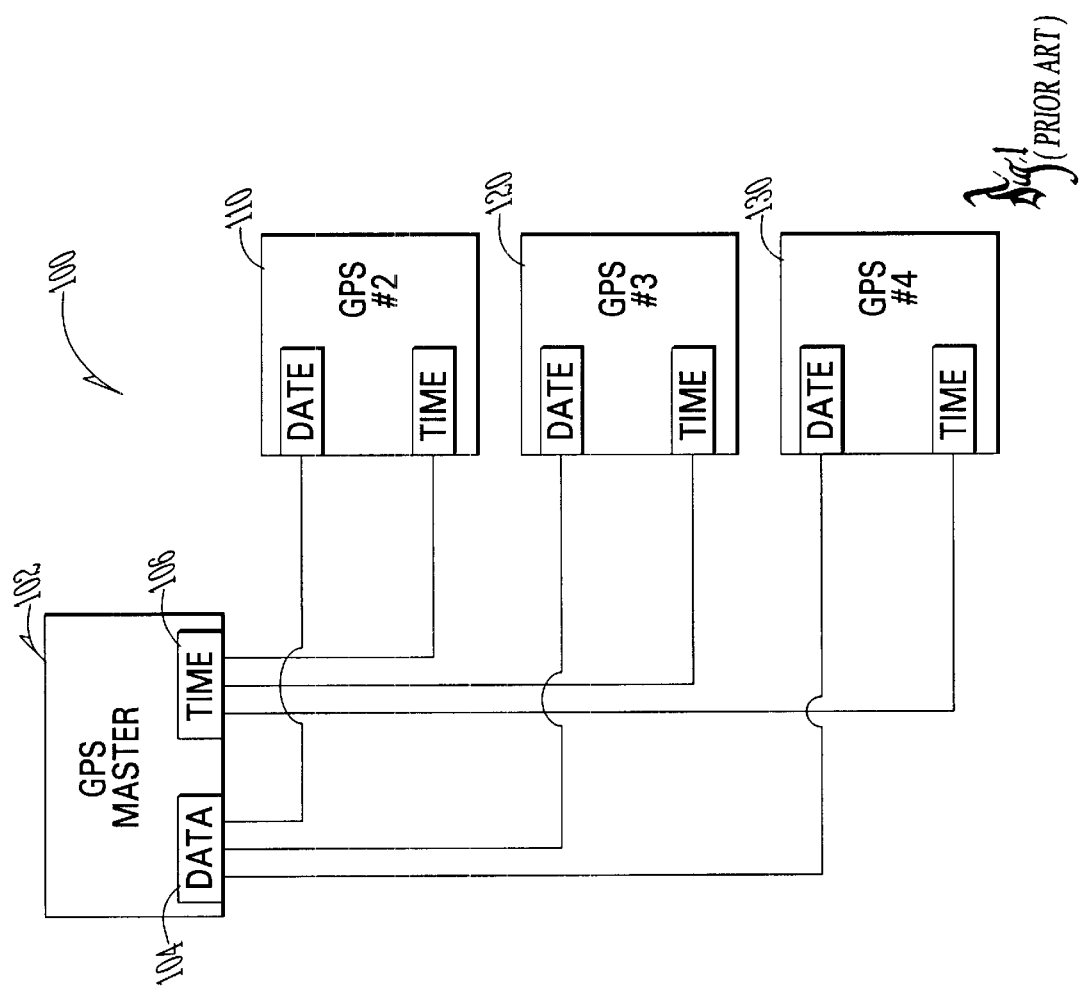
FIG. 1 is a simplified diagram of a multiple GPS receiver system of the prior art.

Now referring to the drawings wherein like numerals refer to like matter throughout, there is shown a multiple GPS receiver interconnection system of the prior art, generally designated 100, having a source of precise time and serial data, labeled a GPS master 102. GPS master 102 includes a serial data port 104 for transmitting data, such as current location for use in initialization, and a timing information port 106 to provide precise timing information. Also shown are time and data receiving GPS receivers 110, 120 and 130, each of which is coupled to GPS master 102 by independent direct connections.

Throughout this document, GPS is used as an example of a broader set of position determination schemes which could include, but are not limited to: Glonass, Loran, or any other system which requires precise and serial data to be transferred from one location to another.

Now referring to FIG. 2, there is shown a multiple GPS receiver interconnection system of the present invention, generally designated 200, including a source of precise time pulse and serial data 202. Source of precise time pulse and serial data 202 selects, in a time multiplexed manner, between either the periodic pulse shown in periodic timing pulse pattern 205 on time pulse line 204 or the serial data 207 on serial data line 206, to transmit on the single combined data and timing communication line 212 with optional line driver 211. Line driver 211 may be preferred, but not necessarily required. In many cases, the source of precise time pulse and serial data 202 will be another GPS receiver. The time and data receiving GPS receivers 220, 230, 240, etc., as well as the source of precise time pulse and serial data 202, default to using the single combined data and timing communication line 212 for serial data transfer. When the source of precise time pulse and serial data 202 needs to send time information to the time and data receiving GPS receivers 220, 230, 240, etc., then the source of precise time pulse and serial data 202 computes the time of the first pulse which will be transmitted, and sends a message to the data receiving GPS receivers 220, 230, 240, etc., to inform them of the time and to instruct them to switch modes, so as to accept the periodic timing pulse pattern 205. Source of precise time pulse and serial data 202 then disconnects the single combined data and timing communication line 212 from the asynchronous serial data 207 on asynchronous serial data line 206 via the select line 208 and then connects single combined data and timing communication line 212 to the periodic timing pulse pattern 205 on time pulse line 204. This switching between time pulse line 204 and asynchronous serial data line 206 is accomplished by 2-to-1 multiplexor 210. The preferred embodiment of the 2-to-1 multiplexor 210 is a device which duplicates one of two inputs on its output pin. Which input is duplicated depends on logic state of the channel section input. Another embodiment of the 2-to-1 multiplexor 210 includes two switches. One switch would tie the serial data line 206 to single combined data and timing communication line 212, and the other switch would tie the time pulse line 204 to the single combined data and timing communication line 212. Only one switch would be on at any moment in time. Another embodiment of the 2-to-1 multiplexor 210 is two logic outputs which are tied together where at least one of the two outputs is in high-impedance state at any moment in time. The output of the 2-to-1 time multiplexor 210 may be buffered by an optional line driver 211 and line receiver 224, 234, 244, etc.

It can be assumed that periodic timing pulse pattern 205 is a pulse that is output at once per second, or any other desirable rate, such as when the universal coordinated time (UTC) second rollover occurs, a convenient event in a GPS receiver. When the time transfer is complete, the source of precise time pulse and serial data 202 disconnects the periodic timing pulse pattern 205 on time pulse line 204 and waits a predetermined idle time to signal completion before commencing transfers of asynchronous serial data 207 to the time and data receiving GPS receivers 220, 230, 240, etc.

The data on single combined data and timing communication line 212 is graphically represented by time multiplexed combined time pulse and asynchronous data signal 213.

From the viewpoint of first time and data receiving GPS receiver 220, second time and data receiving GPS receiver 230, and third time and data receiving GPS receiver 240, etc., which may be viewed as identical receivers operating in parallel, the invention functions as follows:

For example, first time and data receiving GPS receiver 220 receives the incoming information on single combined data and timing communication line 212, possibly through the optional line driver 211 and optional line receiver 224. The incoming information on single combined data and timing communication line 212 is connected to both the first time tagged interrupt 221 via the first internal time tagged interrupt line 226 and to first asynchronous serial port 227 via the first asynchronous serial port connection line 228. The first time and data receiving GPS receiver 220 defaults to assuming that incoming data is being used for serial data communication and disables any interrupts from occurring on the first time tagged interrupt 221. Serial communications occur as normal and until first time and data receiving GPS receiver 220 receives a time transfer message from the source of precise time pulse and serial data 202. When first time and data receiving GPS receiver 220 receives a time transfer message from the source of precise time pulse and serial data 202, it takes the time of a pulse from the serial data message. Then the first time and data receiving GPS receiver 220 disables serial input to first asynchronous serial port 227 and enables first time tagged interrupt 225. First time and data receiving GPS receiver 220 initializes its internal clocks with the time transmitted in the data message 207 and uses the incoming data time pulse 205 to synchronize that time with the first receiver 220's own internal time. While receiving the timing pulse 205, the first time and data receiving GPS receiver 220 may also perform precise frequency calibration of its internal time standard. The source of precise time pulse and serial data 202 outputs a pulse at a known repetition rate or at a rate specified in the serial data message 207. The first time and data receiving GPS receiver 220 measures the elapsed time between pulses with its time tagged interrupt 221 and compares this to the known elapsed time as specified (or agreed upon) repetition rate of time pulse 205. The difference between the actual elapsed and the elapsed as measured by the first time data receiving GPS receiver 220 can be used to compute frequency correction to the first GPS receiver 220's time standard. After the first time and data receiving GPS receiver 220 has received no pulses for a predetermined idle time, it switches back to serial data mode and continues serial communication as normal.

Also shown in FIG. 2 are second time and data receiving GPS receiver 230 and third time and data receiving GPS receiver 240, which include second GPS receiver connection line 232 and third GPS receiver connection line 242 respectively, and second optional line receiver 234 and third optional line receiver 244 respectively, which are respectively coupled to second time tagged interrupt 235 and third time tagged interrupt 245 via second bridged internal time tagged interrupt line 236 and third bridged internal time tagged interrupt line 246. Second time and data receiving GPS receiver 230 and third time and data receiving GPS receiver 240 also include third serial port 247 and third asynchronous serial port connection line 248, as well as second serial port 237 and second serial port connection line 238. It is presently preferred to use an asynchronous data stream; however, the present invention is intended to cover both synchronous and asynchronous data streams.

Other variations of the present invention are also contemplated. For example, it is possible to have a separate dedicated line between the source of precise time pulse and serial data 202 and each of the GPS receivers 220, 230 and 240, so that the precise time and serial data are not broadcast on a single line but transmitted individually to each receiver one at a time or all together in parallel. Another possible variation is that each data link uses two lines for bi-directional serial data flow between the receiver and source of precise time pulse and serial data 202. The innovation of time multiplexing the precise time pulse and serial data on the same outgoing data line still applies. Another variation is the number of GPS receivers which receive time pulse and serial data 220, 230, and 240 could vary from one to one thousand.

It is thought that the method and apparatus of the present invention will be understood from the foregoing description and that it will be apparent that various changes may be made in the form, construct steps and arrangement of the parts and steps thereof, without departing from the spirit and scope of the invention or sacrificing all of their material advantages. The form herein described is merely a preferred exemplary embodiment thereof.

I claim:

1. A system comprising:
   a source of precise time pulse and serial data;
   a time division multiplexor, coupled to said source of precise time pulse and serial data and receiving a periodic timing pulse pattern and serial data therefrom;

a combined data and timing communication line, coupled to said time division multiplexor, and carrying combined data and timing information in a time multiplexed format;

a first time and data receiving GPS receiver coupled to said combined data and timing communication line, the first time and data receiving GPS receiver configured to receive time data and serial data from the source of precise time pulse and serial data; and, said first time and data receiving GPS receiver having a first time tagged interrupt and a first serial port for receiving, over said combined data and timing communication line, said combined data and timing information in a time multiplexed format;

wherein the first time and data receiving GPS receiver is configured to disable receiving serial data through the first serial port while receiving timing information from the source of precise time pulse and serial data.

2. A system of claim 1 further comprising:

a second time and data receiving GPS receiver, coupled to said combined data and timing communication line, the second time and data receiving GPS receiver configured to receive time data and serial data from the source of precise time pulse and serial data; and, said second time and data receiving GPS receiver having a second serial port and a second time tagged interrupt for receiving from a said combined data and timing communication line, said combined data and timing information in a time multiplexed format;

wherein the second time and data receiving GPS receiver is configured to disable receiving serial data while receiving timing information from the source of precise time pulse and serial data.

3. A system of claim 2 wherein said combined data and timing communication line is a single line.

4. A system of claim 3 further comprising a line driver and line receiver disposed between said time multiplexor and any time and data receiving GPS receiver.

5. A system of claim 4 wherein said periodic timing pulse pattern is a periodic pulse train.

6. A system of claim 5 wherein said combined data and timing communication line is an RS 232 line.

7. A system of claim 5 wherein said combined data and timing communication line is an RS 422 line.

8. A system of claim 5 wherein said combined data and timing communication line is a CMOS logic level electrical interface.

9. A system of claim 3 wherein said first time and data receiving GPS receiver includes a chipset therein having an abandoned independent time input port made by removing material to effect electrical isolation.

10. A system of claim 3 wherein said first time and data receiving GPS receiver includes a chipset therein having a jumper connection from an internal source to a connection between said first time tagged interrupt and an external timing information port.

11. A system of claim 1 wherein said time division multiplexor has a select line coupled thereto for providing alternate output with respect to said periodic timing pulse pattern and said serial data.

12. A system of claim 1 wherein said source of precise time pulse and serial data is a GPS receiver.

13. A system of claim 1 wherein said time multiplexor is integral with said source of precise time pulse and serial data.

14. A system comprising:

means for providing precise time pulse and serial data in a time multiplexed format;

a line; and a first GPS receiver coupled to said line and receiving from said line precise time pulse and serial data in said time multiplexed format, wherein the first GPS receiver is configured to disable receiving serial date while receiving the precise time pulse data from the means for providing precise time pulse and serial data.

15. A system of claim 14 wherein said means for providing is a second GPS receiver.

16. A system of claim 14 wherein said line is a single line.

17. A system of claim 15 wherein said line is an RS 232 line.

18. A system of claim 14 wherein said means for providing precise time pulse and serial data in a time multiplexed format is a GPS and a time division multiplexor.

19. A method of communicating information to a plurality of GPS receivers comprising the steps of:

providing a precise timing pulse and serial data in a time multiplexed message;

transmitting said message on a single line;

coupling a plurality of GPS receivers to said single line and providing said time multiplexed message to said plurality of GPS receivers in parallel; and disabling reception of serial data by the plurality of GPS receivers while receiving the precise timing pulse.

20. A method of claim 19 wherein said step of providing precise timing pulse and serial data in a time multiplexed message is a GPS receiver and a time multiplexor.

21. A system of claim 1 wherein said time multiplexor is two separate switches with an on/off control for each switch, whereby only one switch is on at a time and an output of both switches is connected to a combined time and data line.

22. A system of claim 15 wherein said line is an RS 422 line.

23. A system of claim 15 wherein said line is a CMOS logic level line.

* * * * *